US011767195B2

(12) United States Patent
Chae et al.

(10) Patent No.: US 11,767,195 B2
(45) Date of Patent: Sep. 26, 2023

(54) SAFETY INSPECTION SYSTEM FOR OCCUPANT EVACUATION ELEVATOR, AND METHOD THEREOF

(71) Applicant: KOREA INSTITUTE OF CIVIL ENGINEERING AND BUILDING TECHNOLOGY, Gyeonggi-Do (KR)

(72) Inventors: Seung Un Chae, Seoul (KR); Bum Yeon Cho, Seoul (KR); Heung Youl Kim, Seoul (KR); Ki Seok Kwon, Gyeonggi-do (KR)

(73) Assignee: KOREA INSTITUTE OF CIVIL ENGINEERING AND BUILDING TECHNOLOGY, Gyeonggi-Do (KR)

( * ) Notice: Subject to any disclaimer, the term of this patent is extended or adjusted under 35 U.S.C. 154(b) by 1344 days.

(21) Appl. No.: 16/198,800

(22) Filed: Nov. 22, 2018

(65) Prior Publication Data
US 2019/0152745 A1     May 23, 2019

(30) Foreign Application Priority Data

Nov. 22, 2017    (KR) .......................... 10-2017-0156621

(51) Int. Cl.
     *B66B 5/00*        (2006.01)
     *B66B 5/02*        (2006.01)
     (Continued)

(52) U.S. Cl.
     CPC .............. *B66B 5/0031* (2013.01); *B66B 1/28* (2013.01); *B66B 1/3423* (2013.01);
     (Continued)

(58) Field of Classification Search
     CPC ....... B66B 5/00; B66B 5/0006; B66B 5/0018; B66B 5/0031; B66B 5/02–027;
     (Continued)

(56) References Cited

U.S. PATENT DOCUMENTS

| 6,809,650 | B2 * | 10/2004 | Pfenniger ............. B66B 7/1246 187/390 |
| 10,508,001 | B2 * | 12/2019 | Kitajima ................... B66B 5/02 |
| 2005/0136986 | A1 | 6/2005 | Santa Cruz et al. |

FOREIGN PATENT DOCUMENTS

| KR | 20070015237 | 2/2007 |
| KR | 100701789 | 3/2007 |

(Continued)

*Primary Examiner* — Christopher Uhlir
(74) *Attorney, Agent, or Firm* — JCIPRNET (57) ABSTRACT

A safety inspection system of an occupant evacuation elevator capable of having a laser range finder installed on each of an elevator rope and an elevator guide rail of the occupant evacuation elevator of a skyscraper and checking a length and verticality of each of the elevator rope and the elevator guide rail measured from the laser range finder to monitor slight distortion or location variation in real time, and accordingly, capable of easily performing a safety inspection of the occupant evacuation elevator, capable of performing the safety inspection of the occupant evacuation elevator in real time to operate the occupant evacuation elevator again in an operation mode of the occupant evacuation elevator according to an occurrence of a disaster situation in the skyscraper, and accordingly, capable of safely and quickly evacuating occupants and a method thereof are provided.

12 Claims, 7 Drawing Sheets

(51) Int. Cl.
*B66B 1/34* (2006.01)
*B66B 1/28* (2006.01)
*G01S 17/08* (2006.01)

(52) U.S. Cl.
CPC ............ *B66B 5/0087* (2013.01); *B66B 5/021* (2013.01); *B66B 5/024* (2013.01); *G01S 17/08* (2013.01); *B66B 2201/40* (2013.01)

(58) Field of Classification Search
CPC ......... B66B 7/027; B66B 7/12; B66B 7/1207; B66B 7/1238
See application file for complete search history.

(56) References Cited

FOREIGN PATENT DOCUMENTS

| | | |
|---|---|---|
| KR | 101049008 | 7/2011 |
| KR | 20120006524 | 1/2012 |
| KR | 101225039 | 1/2013 |
| KR | 2020150003476 | 9/2015 |
| KR | 1020170119945 | 10/2017 |

* cited by examiner

SAFETY INSPECTION SYSTEM FOR OCCUPANT EVACUATION ELEVATOR, AND METHOD THEREOF

CROSS-REFERENCE TO RELATED APPLICATION

This application claims priority to and the benefit of Korean Patent Application No. 2017-0156621, filed on Nov. 22, 2017, the disclosure of which is incorporated herein by reference in its entirety.

BACKGROUND

1. Field of the Invention

The present disclosure relates to a safety inspection of an occupant evacuation elevator, and more specifically, to a safety inspection system of an occupant evacuation elevator configured to check a length and verticality of each of an elevator rope and an elevator guide rail to inspect safety of each of the elevator rope and the elevator guide rail in an operation mode which operates an occupant evacuation elevator (OEE) according to an occurrence of a disaster situation in a skyscraper, and a method thereof.

2. Discussion of Related Art

Generally, an elevator is installed in each of various kinds of high-rise buildings built for residential occupancies, business purposes, and the like for smooth vertical movement of passengers who visit the high-rise buildings.

The elevator is provided with an elevator car configured to move along a hoistway vertically formed in the building in a state in which the passengers ride therein to move the passengers, a motor, a traction machine, an elevator rope, and the like, includes a machine part configured to move the elevator car to a corresponding stage according to a button operation of the passenger, and further includes an elevator controller configured to control the machine part according to the button operation of the passenger so that the elevator car moves to the corresponding stage.

Generally, the elevator is not used in the high-rise building when a disaster situation such as fire or the like occurs. However, an elevator is globally used for evacuation in a skyscraper after a case in which many people use an elevator to quickly evacuate to an evacuation safe area when a disaster situation occurs. An elevator in which safety measures are relatively improved in comparison with a general passenger elevator to be used for evacuation in the skyscraper like the above refers to an occupant evacuation elevator (OEE).

Particularly, at least one passenger elevator in the skyscraper should be installed to be suitable to an installation standard of the occupant evacuation elevator. For example, a pressurization smoke control system, which is configured to prevent smoke introduction when fire occurs, is installed in the occupant evacuation elevator, and an emergency power is supplied even when a blackout occurs using an emergency power generator.

Figure 1:
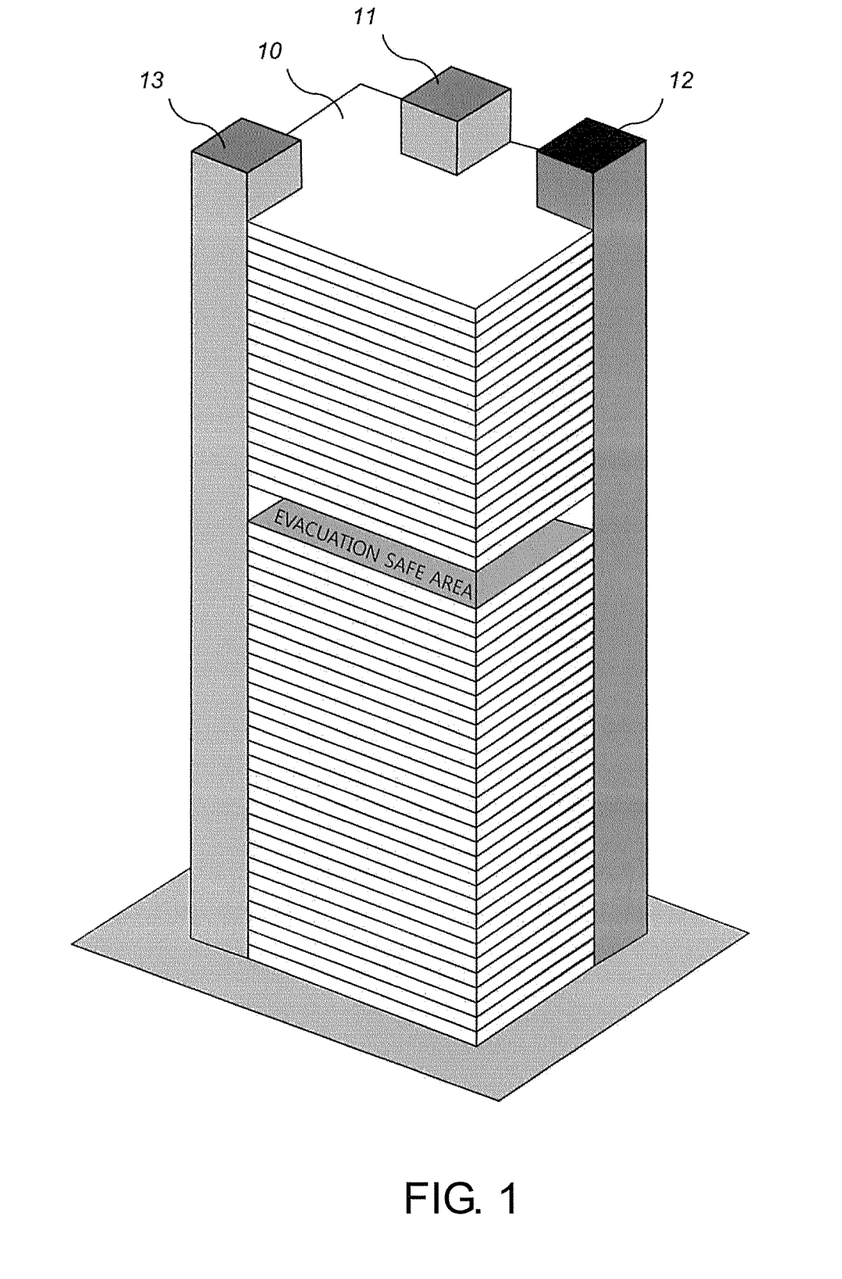
FIG. 1 is a view illustrating an installation concept of an occupant evacuation elevator in a general high-rise building.

Meanwhile, FIG. 1 is a view illustrating an installation concept of an occupant evacuation elevator in a general high-rise building.

As shown in FIG. 1, an occupant evacuation elevator 12 can select the most suitable method among a method of using a general passenger elevator 11 by improving the performance of the general passenger elevator 11, a method of using an emergency elevator 13, and a method of separately installing the occupant evacuation elevator 12 in consideration of safety, suitability of an operating purpose, and economic feasibility. An operating purpose of the occupant evacuation elevator 12 is provided so that occupants directly use an elevator to evacuate to an evacuation safe area separately from a purpose for saving the occupants due to an extinguishing act of a fire department.

First, a usage of the emergency elevator 13 used for purposes of evacuation and the extinguishing act is to be used for evacuation of the occupants at an initial state of fire and to be used for the extinguishing act after the fire department arrives. Since confusions can increase when the occupants cannot use the emergency elevator after waiting to evacuate, and evacuation and extinguishment usages have clearly different usage purposes and methods, use of the emergency elevator 13 as the occupant evacuation elevator 12 is illogical.

Further, the method of separately installing the occupant evacuation elevator 12 in the high-rise building is efficient for safety and maintenance, but since the number of installations is limited in comparison with the general passenger elevator 11, and a separate installation area and a countermeasure of uselessness of equipment are required, the method of separately installing the occupant evacuation elevator 12 is illogical like the above.

On the other hand, the method of using the general passenger elevator 11 by improving the performance of the general passenger elevator 11 is economical because idleness of equipment is prevented and a separate installation of the elevator is not required, and the method is efficient because a homing instinct of a person is considered. However, since using the general passenger elevator 11 as the occupant evacuation elevator 12 in the skyscraper can confuse people, an accurate promotion of the above is necessary, and thorough maintenance and training are necessary so that the general passenger elevator 11 is smoothly used as the occupant evacuation elevator 12.

Hereinafter, the occupant evacuation elevator 12 can be described as an elevator manufactured to be ordinarily used for passengers but which can be used for evacuation when a disaster such as fire or the like occurs. That is, the occupant evacuation elevator 12 refers to an elevator which is not additionally installed separately from the passenger elevator 11 like the emergency elevator 13, but an elevator having an evacuation function among the passenger elevators 11, and at least one passenger elevator in a high-rise building 10 is installed to be suitable to the installation standard of the occupant evacuation elevator. The installation standard of the occupant evacuation elevator 12 is defined to be divided into an occupant evacuation elevator platform structure, an occupant evacuation elevator hoistway structure, an occupant evacuation elevator machine room structure, a standby power for the occupant evacuation elevator, and the like.

Figure 2:
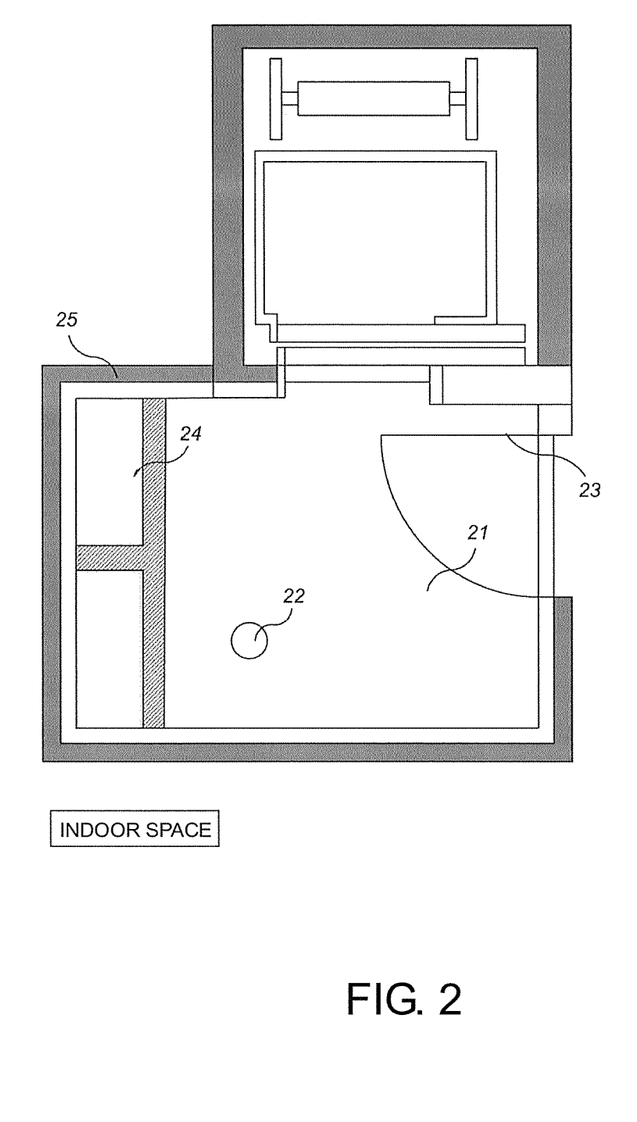
FIG. 2 is a plan view illustrating a platform structure of the occupant evacuation elevator.

Meanwhile, FIG. 2 is a plan view illustrating a platform structure of the occupant evacuation elevator.

As shown in FIG. 2, a part of the occupant evacuation elevator excluding an entrance of a platform 21 should be partitioned with other parts of the building by a floor and a wall each having a fire-resistant structure 25, and in this case, the platform 21 can be connected to the inside of each stage, a first grade fire door 23 should be installed at the entrance, and the first grade fire door 23 should have a structure which can maintain a close state in this case. Further, finishing of the parts which comes into contact with an indoor space should be formed of an incombustible material, and illumination equipment 22 operated by the standby power should be installed. In addition, a floor area of the platform 21 should be greater than or equal to 6 m² on the basis of one occupant evacuation elevator 12, and a sign which notifies of the occupant evacuation elevator should be installed around the entrance of the platform 21. In addition, a smoke exhaustion equipment 24 should be installed in the platform 21, but the smoke exhaustion equipment may not be installed when smoke control equipment is installed.

Meanwhile, an elevator according to conventional technology is difficult to slightly adjust an elevator rope, and is difficult to quickly process safety inspection of an occupant evacuation elevator when a disaster situation occurs and to slightly adjust the elevator rope as needed. For example, safety inspection for problems such as separation from the elevator rope and an elevator guide rail of the occupant evacuation elevator, and the like when a disaster situation such as an earthquake, a fire explosion, and the like occurs is necessary.

PRIOR ART DOCUMENT

Patent Document (Patent Document 0001) Korean Patent Application No. 10-701789 (application date: Dec. 15, 2006), title of the disclosure: "driving system of lifesaving elevator of skyscraper"

(Patent Document 0002) Korean publicized utility model No. 2015-3476 (publication date: Sep. 22, 2015), title of the disclosure: "present location recognition system of elevator car using distance measuring laser sensor"

(Patent Document 0003) Korean Patent Application No. 10-1225039 (application date: Dec. 7, 2007), title of the disclosure: "method and apparatus for inspecting elevator hoistways"

(Patent Document 0004) Korean Laid-open Patent No. 2017-119945 (publication date: Oct. 30, 2017), title of the disclosure: "fire evacuation apparatus for high-rise building"

(Patent Document 0005) Korean Patent Application No. 10-1049008 (application date: Dec. 9, 2009), title of the disclosure: "balcony type emergency escape apparatus of high-rise building"

(Patent Document 0006) Korean Laid-open Patent No. 2007-15237 (publication date: Feb. 1, 2007), title of the disclosure: "driving apparatus of high-rise building fire extinguishing and lifesaving elevator"

(Patent Document 0007) Korean Laid-open Patent No. 2012-6524 (publication date: Jan. 18, 2012), title of the disclosure: "notice apparatus of elevator system".

SUMMARY OF THE INVENTION

The present disclosure is directed to a safety inspection system of an occupant evacuation elevator capable of monitoring slight distortion or location variation in real time by installing a laser range finder on each of an elevator rope and an elevator guide rail of the occupant evacuation elevator of a skyscraper, and checking a length and verticality of each of the elevator rope and the elevator guide rail measured from the laser range finder and a method thereof.

The present disclosure is directed to a safety inspection system of an occupant evacuation elevator capable of performing safety inspection of the occupant evacuation elevator in real time to operate the occupant evacuation elevator again in an operation mode of the occupant evacuation elevator according to an occurrence of a disaster situation in the skyscraper and a method thereof.

There is provided a safety inspection system of an occupant evacuation elevator according to the present disclosure including: an occupant evacuation elevator provided with an elevator rope and an elevator guide rail, and in which, while the occupant evacuation elevator is ordinarily used for passengers in a skyscraper, when a disaster situation occurs, safety inspection is performed in a state in which the occupant evacuation elevator is stopped in an operation mode; an occupant evacuation elevator safety inspection part configured to stop the operation of the occupant evacuation elevator in the operation mode which operates the occupant evacuation elevator to perform the safety inspection to operate the occupant evacuation elevator again; a first laser range finder attached to both ends of the elevator rope to measure a length and verticality of the elevator rope; and a second laser range finder attached to both ends of the elevator guide rail to measure a length and verticality of the elevator guide rail, wherein the occupant evacuation elevator safety inspection part completes the safety inspection of the occupant evacuation elevator and operates the occupant evacuation elevator again when the length and verticality of each of the elevator rope and the elevator guide rail are less than or equal to a predetermined error range.

Here, the occupant evacuation elevator safety inspection part may include a first laser range finder driving part configured to drive the first laser range finder; a second laser range finder driving part configured to drive the second laser range finder; a power supply device configured to supply uninterruptible power to the first laser range finder and the laser range finder; an elevator rope length and verticality checking part configured to check the length and verticality of the elevator rope according to a measuring result of the first laser range finder driving part; an elevator guide rail length and verticality checking part configured to check the length and verticality of the elevator guide rail according to a measuring result of the second laser range finder driving part; and a safety inspection controller configured to drive the first and second laser range finder driving parts and compare whether the length and verticality of each of the elevator rope length and verticality checking part and the elevator guide rail length and verticality checking part are within a predetermined error range to determine whether the elevator rope and the elevator guide rail are slightly adjusted, and configured to complete the safety inspection of the occupant evacuation elevator and operate the occupant evacuation elevator again when the length and verticality of each of the elevator rope and the elevator guide rail are less than or equal to the predetermined error range.

Here, the occupant evacuation elevator safety inspection part may further include an adjustment amount determination part configured to compare the length and verticality of each of the elevator rope and the elevator guide rail with the error range of a predetermined length and verticality to determine a slight adjustment amount of each of the elevator rope and the elevator guide rail when slight adjustment is necessary.

Here, tension of the elevator rope may be slightly adjusted and location variation of the elevator guide rail may be slightly adjusted when the adjustment amount determination part determines that slight adjustment is necessary.

Here, the occupant evacuation elevator safety inspection part may stop operating the occupant evacuation elevator again when the length and verticality of the elevator rope and the elevator guide rail depart from the predetermined error range.

Here, the first laser range finder may include a first laser light emitting part and a first laser light receiving part and measure the length and verticality of the elevator rope, and the second laser range finder may include a second laser light emitting part and a second laser light receiving part and measure the length and verticality of the elevator guide rail.

Here, the first laser range finder and the second laser range finder may be continuously driven to check the length and verticality of each of the elevator rope and the elevator guide rail in real time when the occupant evacuation elevator is operated again.

Meanwhile, there is provided a safety inspection method of an occupant evacuation elevator according to the present disclosure including: a) normally operating all elevators of a skyscraper; b) checking whether a disaster situation occurs in the skyscraper; c) stopping operations of all elevators of the skyscraper and converting to an operation mode of an occupant evacuation elevator when the disaster situation occurs; d) driving first and second laser range finders respectively installed in an elevator rope and an elevator guide rail of the occupant evacuation elevator; e) checking a length and verticality of each of the elevator rope and the elevator guide rail measured from the first and second laser range finders; and f) completing safety inspection of the occupant evacuation elevator and operating the occupant evacuation elevator again.

Here, in the operation e), the length and verticality of each of the elevator rope and the elevator guide rail are compared with the error range of a predetermined length and verticality to determine whether slight adjustment is necessary, and then the elevator rope and the elevator guide rail are slightly adjusted.

Here, tension of the elevator rope may be slightly adjusted and location variation of the elevator guide rail may be slightly adjusted when slightly adjusting the elevator rope and the elevator guide rail is necessary.

Here, in the operation d), the first and second laser range finders may be continuously driven to check the length and verticality of each of the elevator rope and the elevator guide rail in real time when the occupant evacuation elevator is operated again.

Here, operating the occupant evacuation elevator again may be stopped when the length and verticality of each of the elevator rope and the elevator guide rail depart from the predetermined error range.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings which may allow one of ordinary skill in the art to easily perform the present disclosure. The present disclosure may be implemented in various forms and is not limited to the following embodiments. Further, components not related to the description are omitted in the drawings to clearly describe the present disclosure, and similar reference symbols are used for similar components in the description.

In the entire description, a case in which one part "includes" one component is not meant to preclude other components but to further include other components unless specifically stated otherwise. Further, terms such as " . . . part" and the like disclosed in the description mean units which process at least one function or operation and the above may be implemented in hardware or software, or implemented in coupling of hardware and software.

[A Safety Inspection System 100 of an Occupant Evacuation Elevator]

Figure 3:
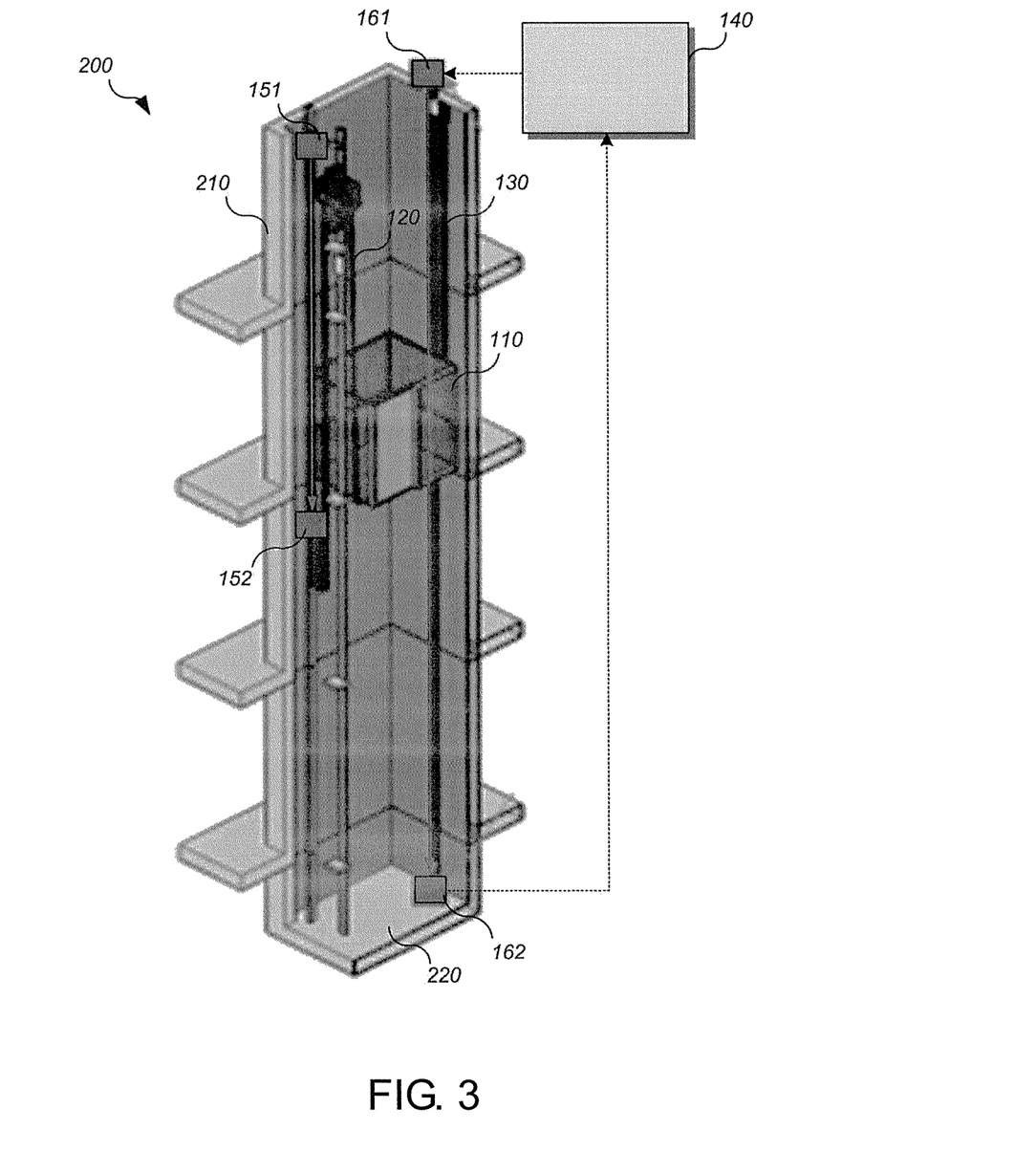
FIG. 3 is a view schematically illustrating a concept of a safety inspection system of an occupant evacuation elevator according to an embodiment of the present disclosure.
Figure 4:
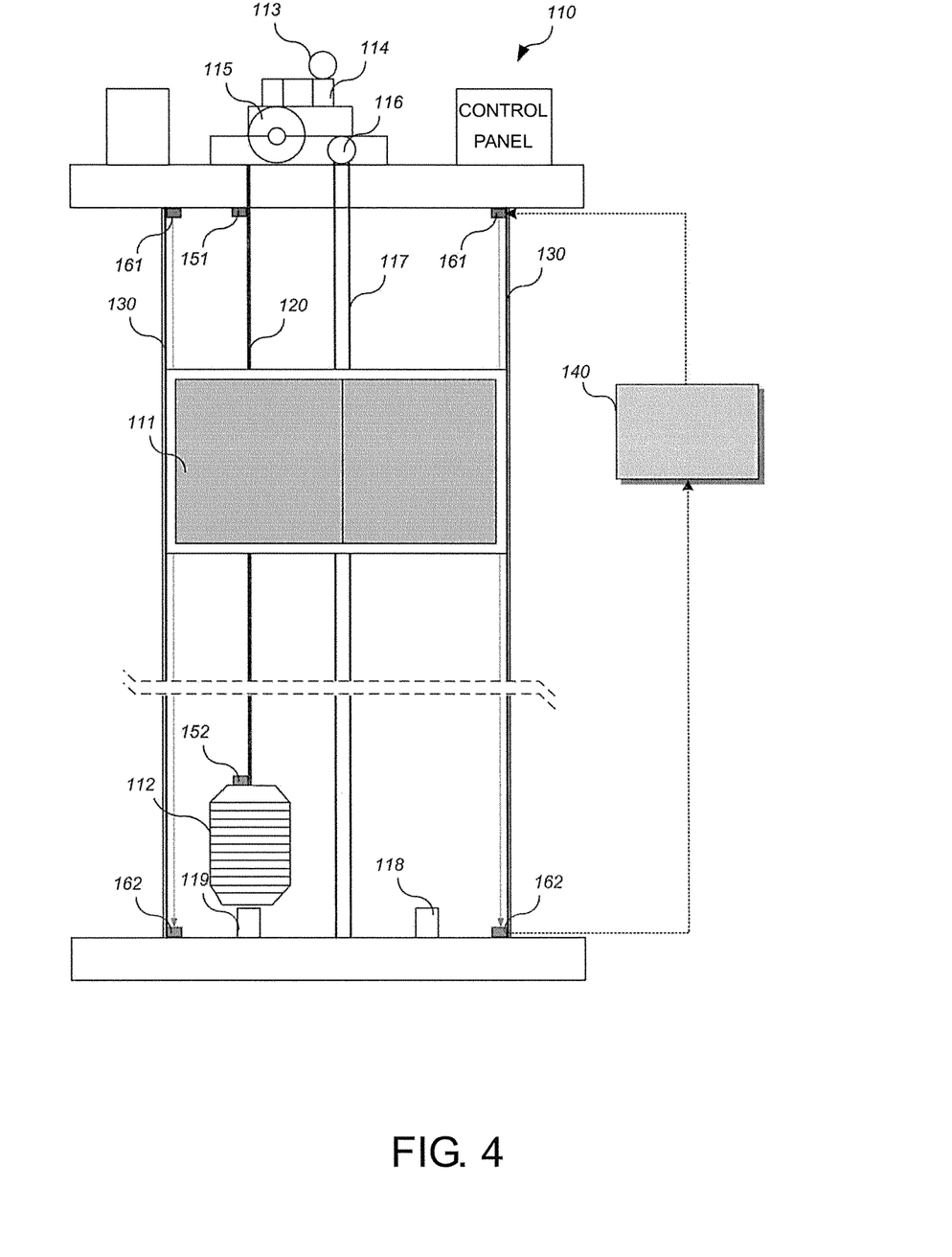
FIG. 4 is a view specifically illustrating a case in which first and second laser range finders are installed in the occupant evacuation elevator in the safety inspection system of the occupant evacuation elevator according to the embodiment of the present disclosure.

FIG. 3 is a view schematically illustrating a concept of a safety inspection system of an occupant evacuation elevator according to an embodiment of the present disclosure, and FIG. 4 is a view specifically illustrating a case in which first and second laser range finders are installed in the occupant evacuation elevator in the safety inspection system of the occupant evacuation elevator according to the embodiment of the present disclosure.

Referring to FIGS. 3 and 4, the safety inspection system of an occupant evacuation elevator according to an embodiment of the present disclosure performs safety inspection of an occupant evacuation elevator 110 so that occupants may use stairs and the occupant evacuation elevator 110 for safe and quick evacuation to evacuate from a corresponding evacuation stage 210 to an evacuation safe area 220 when a disaster situation occurs in a skyscraper 200.

For example, the occupant evacuation elevator 110 is ordinarily used for a passenger in the skyscraper 200, and the safety inspection of the occupant evacuation elevator 110 is performed in a state in which the occupant evacuation elevator is stopped in an operation mode (emergency mode) when the disaster situation occurs. That is, when all elevators stop in the disaster situation, the occupant evacuation elevator 110 is used for evacuation of the occupants after performing the quick safety inspection.

Specifically, referring to FIG. 4, the occupant evacuation elevator 110 includes a car 111, a balance weight 112, a motor 113, a traction machine 114, a fixed pulley 115, a speed governor 116, a speed governor rope 117, a car buffer 118, a balance weight buffer 119, and the like, and also includes an elevator rope 120 and an elevator guide rail 130 but is not limited thereto.

For example, the elevator guide rail 130 regulates a location of each of the car 111 and the balance weight 112 in a hoistway plane, is installed to prevent inclination because a self-weight or a load of the car 111 is not always located at a center of the car 111, and is installed to maintain a vertical load when an emergency stopping device operates. The elevator guide rail 130 is generally used in a T shape and vertically installed on a straight line in the hoistway.

Here, as shown in FIG. 4, a first laser light emitting part 151 and a first laser light receiving part 152 are attached to both ends of the elevator rope 120 to measure a length and verticality of the elevator rope 120, and a second laser light emitting part 161 and a second laser light receiving part 162 are attached to both ends of the elevator guide rail 130 to measure a length and verticality of the elevator guide rail 130, and in this case, the elevator rope 120 and the elevator guide rail 130 may be slightly adjusted when the occupant evacuation elevator safety inspection part 140 performs the safety inspection of the occupant evacuation elevator 110.

Accordingly, the safety inspection system 100 of the occupant evacuation elevator according to the embodiment of the present disclosure may perform the safety inspection of the occupant evacuation elevator 110 in real time in the operation mode of the occupant evacuation elevator 110 and, accordingly, may quickly operate the occupant evacuation elevator 110 again to safely and quickly evacuate the occupants.

Figure 5:
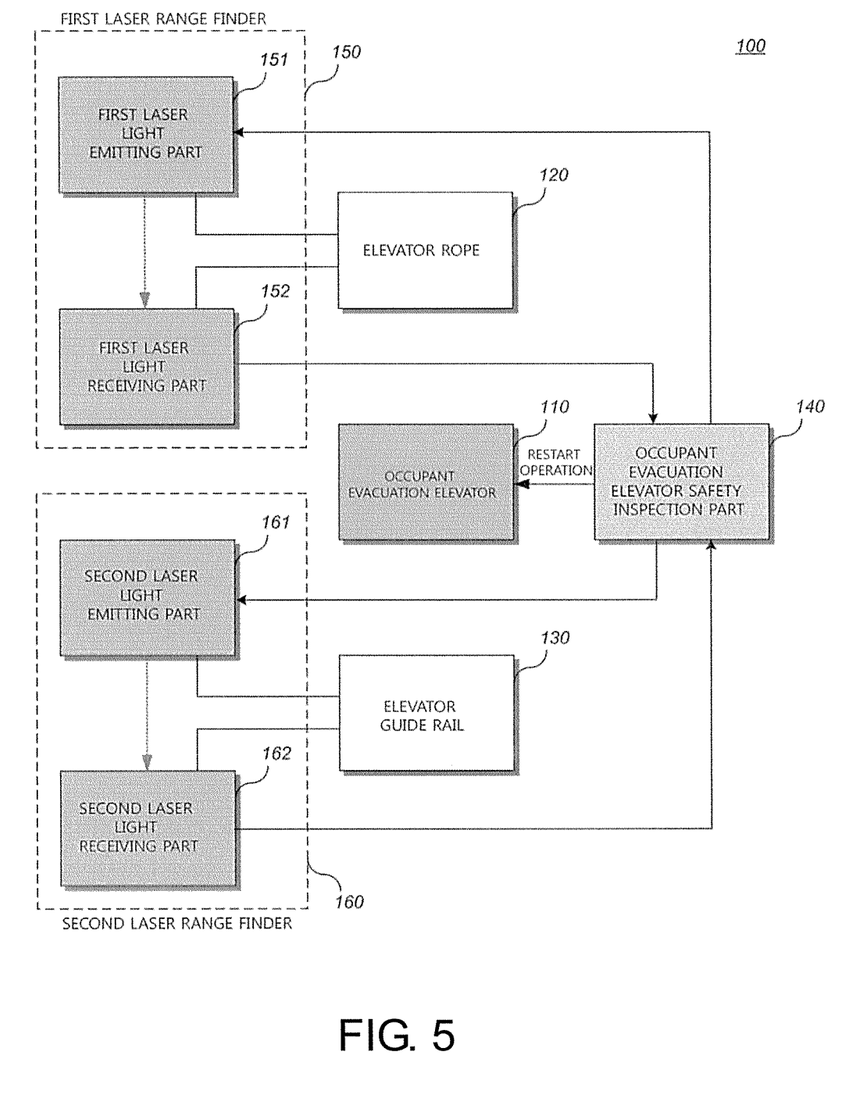
FIG. 5 is a block diagram of the safety inspection system of the occupant evacuation elevator according to the embodiment of the present disclosure.
Figure 6:
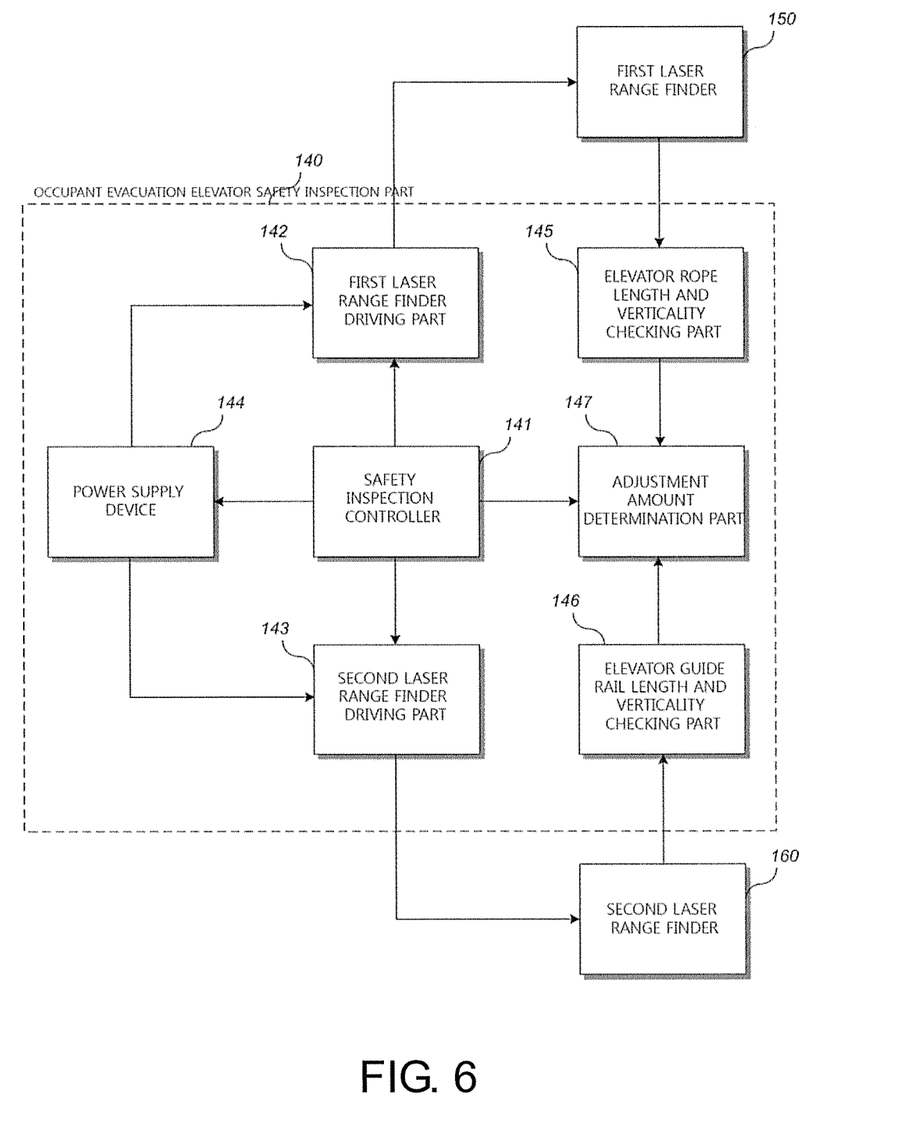
FIG. 6 is a specific block diagram of an occupant evacuation elevator safety inspection part shown in FIG. 5.

Meanwhile, FIG. 5 is a block diagram of the safety inspection system of the occupant evacuation elevator according to the embodiment of the present disclosure, and FIG. 6 is a specific block diagram of an occupant evacuation elevator safety inspection part shown in FIG. 5.

Referring to FIG. 5, the safety inspection system 100 of the occupant evacuation elevator according to the embodiment of the present disclosure may include the occupant evacuation elevator 110, the elevator rope 120, the elevator guide rail 130, the occupant evacuation elevator safety inspection part 140, a first laser range finder 150, and a second laser range finder 160, wherein the first laser range finder 150 may include the first laser light emitting part 151 and the first laser light receiving part 152, and the second laser range finder 160 may include the second laser light emitting part 161 and the second laser light receiving part 162.

The occupant evacuation elevator 110 is provided with the elevator rope 120 and the elevator guide rail 130 and ordinarily used for passengers in the skyscraper 200, and the safety inspection is performed in the state in which the occupant evacuation elevator is stopped in the operation mode (emergency mode) when the disaster situation occurs.

The occupant evacuation elevator safety inspection part 140 stops the occupant evacuation elevator in the operation mode which operates the occupant evacuation elevator 110 and performs the safety inspection to operate the occupant evacuation elevator 110 again.

The first laser range finder 150 is attached to both ends of the elevator rope 120 to measure the length and verticality of the elevator rope 120. In this case, the first laser range finder 150 includes the first laser light emitting part 151 and the first laser light receiving part 152 and measures the length and verticality of the elevator rope 120.

The second laser range finder 160 is attached to both ends of the elevator guide rail 130 to measure the length and verticality of the elevator guide rail 130. In this case, the second laser range finder 160 includes the second laser light emitting part 161 and the second laser light receiving part 162 and measures the length and verticality of the elevator guide rail 130.

Further, the first laser range finder 150 and the second laser range finder 160 are continuously driven to check the length and verticality of each of the elevator rope 120 and the elevator guide rail 130 in real time when the occupant evacuation elevator 110 is operated again.

In the safety inspection system 100 of the occupant evacuation elevator according to the embodiment of the present disclosure, the occupant evacuation elevator safety inspection part 140 may complete the safety inspection of the occupant evacuation elevator 110 and operate the occupant evacuation elevator 110 again when the length and verticality of each of the elevator rope 120 and the elevator guide rail 130 are less than or equal to a predetermined error range. Further, the occupant evacuation elevator safety inspection part 140 may stop operating the occupant evacuation elevator 110 again when the length and verticality of each of the elevator rope 120 and the elevator guide rail 130 depart from the predetermined error range.

Specifically, referring to FIG. 6, the occupant evacuation elevator safety inspection part 140 includes a safety inspection controller 141, a first laser range finder driving part 142, a second laser range finder driving part 143, a power supply device 144, an elevator rope length and verticality checking part 145, an elevator guide rail length and verticality checking part 146, and an adjustment amount determination part 147.

The first laser range finder driving part 142 drives the first laser range finder 150, and the second laser range finder driving part 143 drives the second laser range finder 160.

The power supply device 144 supplies uninterruptible power to the first laser range finder 150 and the second laser range finder 160.

The elevator rope length and verticality checking part 145 checks the length and verticality of the elevator rope 120 according to a measuring result of the first laser range finder driving part 142.

The elevator guide rail length and verticality checking part 146 checks the length and verticality of the elevator guide rail 130 according to a measuring result of the second laser range finder driving part 143.

The safety inspection controller 141 drives the first and second laser range finder driving parts 142 and 143 and compares whether the length and verticality of each of the elevator rope length and verticality checking part 145 and the elevator guide rail length and verticality checking part 146 are within a predetermined error range to determine whether the elevator rope 120 and the elevator guide rail 130 are slightly adjusted, and completes the safety inspection of the occupant evacuation elevator 110 and operates the occupant evacuation elevator 110 again when the length and verticality of each of the elevator rope 120 and the elevator guide rail 130 are less than or equal to the predetermined error range.

In the occupant evacuation elevator safety inspection part 140, the adjustment amount determination part 147 compares the length and verticality of each of the elevator rope 120 and the elevator guide rail 130 with the error range of a predetermined length and verticality to determine a slight adjustment amount of each of the elevator rope 120 and the elevator guide rail 130 when slight adjustment is necessary. In this case, tension of the elevator rope 120 may be slightly adjusted and location variation of the elevator guide rail 130 may be slightly adjusted when the adjustment amount determination part 147 determines that the slight adjustment is necessary.

Accordingly, the safety inspection system 100 of the occupant evacuation elevator according to the embodiment of the present disclosure may perform safety inspection and continuous monitoring for quick conversion to the operation mode of the occupant evacuation elevator used as an evacuation system in the skyscraper and may slightly adjust tightening of the elevator rope or location variation of the elevator guide rail as necessary.

Further, the safety inspection system 100 of the occupant evacuation elevator according to the embodiment of the present disclosure may monitor the length and verticality of each of the elevator rope 120 and the elevator guide rail 130 in real time using the first and second laser range finders 150 and 160 installed at each safety inspection part to perform the safety inspection of separation of the elevator rope 120 and the elevator guide rail 130 of the occupant evacuation elevator 110, deformation of the elevator guide rail 130, and the like in real time.

[A Safety Inspection Method of an Occupant Evacuation Elevator]

Figure 7:
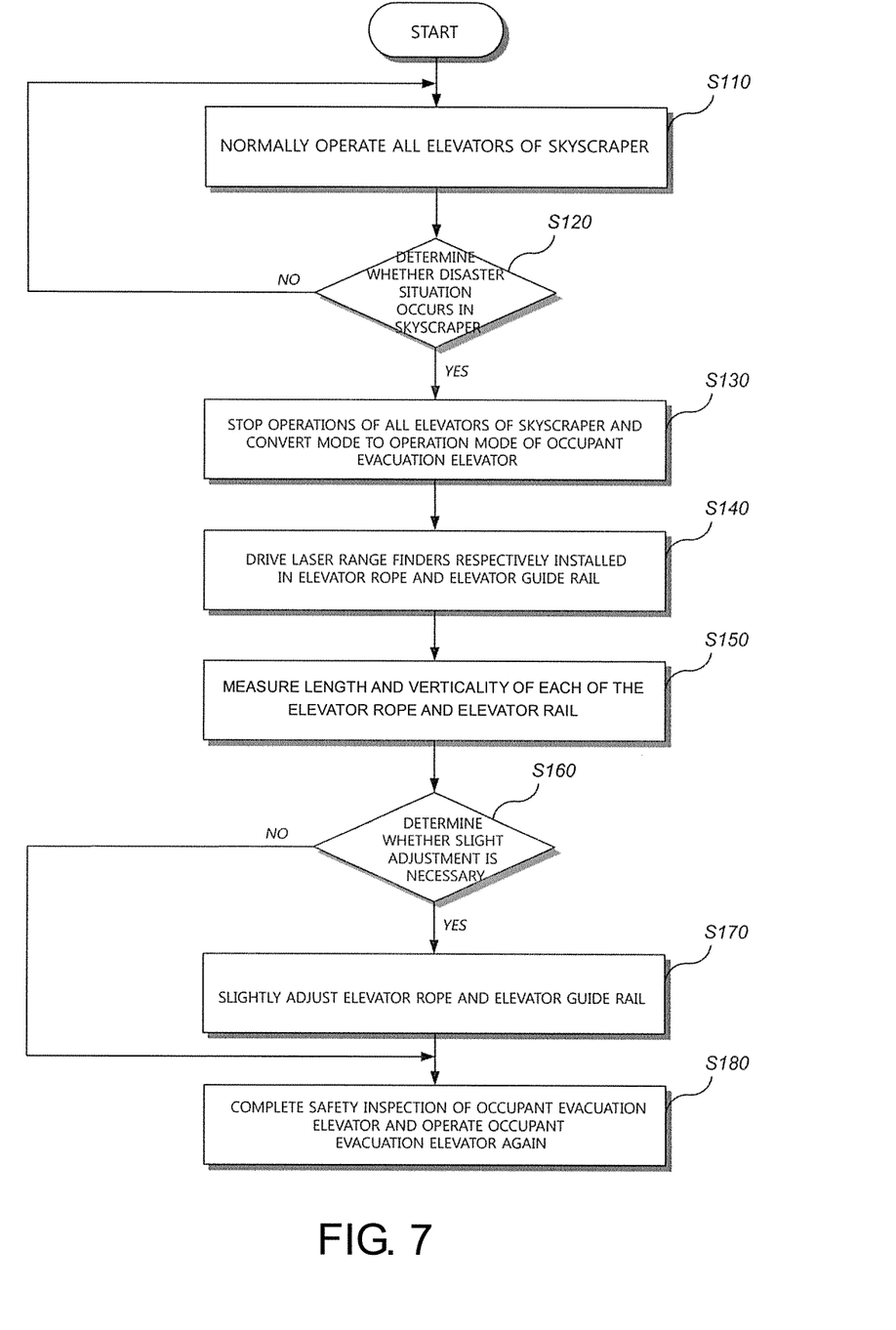
FIG. 7 is a flow chart illustrating a safety inspection method of the occupant evacuation elevator according to the embodiment of the present disclosure.

FIG. 7 is a flow chart illustrating a safety inspection method of the occupant evacuation elevator according to the embodiment of the present disclosure.

Referring to FIG. 7, in the safety inspection method of the occupant evacuation elevator according to the embodiment of the present disclosure, first, all elevators of the skyscraper 200 are normally operated (S110).

Further, whether the disaster situation occurs in the skyscraper 200 is checked (S120).

In addition, when the disaster situation occurs, operations of all elevators of the skyscraper 200 are stopped, and a mode is converted to the operation mode of the occupant evacuation elevator 110 (S130). Specifically, when the disaster situation occurs in the skyscraper 200, all elevators return to a base stage or are stopped at a corresponding stage, and the occupant evacuation elevator 110 is operated again after the safety inspection. Accordingly, the safety inspection for quickly operating the occupant evacuation elevator 110 again should be performed in real time after the operation of the occupant evacuation elevator 110 is stopped. Here, in the safety inspection method of the occupant evacuation elevator according to the embodiment of the present disclosure, the length, the verticality, and the like of each of the elevator rope 120 and the elevator guide rail 130 of the occupant evacuation elevator 110 may be monitored in real time, and, in this case, may be slightly adjusted when the slight adjustment is necessary.

Further, the first and second laser range finders 150 and 160 respectively installed in the elevator rope 120 and the elevator guide rail 130 of the occupant evacuation elevator 110 are driven (S140). Specifically, the first laser range finder 150 includes the first laser light emitting part 151 and the first laser light receiving part 152 and is installed at both ends of the elevator rope 120, and the second laser range finder 160 includes the second laser light emitting part 161 and the second laser light receiving part 162 and is installed at both ends of the elevator guide rail 130. The length (or distance) and verticality of each of the elevator rope 120 and the elevator guide rail 130 may be measured by the first and second laser range finders 150 and 160.

Further, the length and verticality of each of the elevator rope 120 and the elevator guide rail 130 measured by the first and second laser range finders 150 and 160 are respectively checked (S150). In addition, the first and second laser range finders 150 and 160 may be continuously driven to check the length and verticality of each of the elevator rope 120 and the elevator guide rail 130 in real time when the occupant evacuation elevator 110 is operated again.

In addition, the length and verticality of each of the elevator rope 120 and the elevator guide rail 130 are compared with the error range of the predetermined length and verticality to determine whether the slight adjustment of the elevator rope 120 and the elevator guide rail 130 is necessary (S160).

In addition, the elevator rope 120 and the elevator guide rail 130 are slightly adjusted (S170). In this case, when the slight adjustment of the elevator rope 120 and the elevator guide rail 130 is necessary, the tension of the elevator rope 120 may be slightly adjusted, and the location variation of the elevator guide rail 130 may be slightly adjusted.

Further, the safety inspection of the occupant evacuation elevator 110 is completed, and the occupant evacuation elevator 110 is operated again (S180).

In addition, the first and second laser range finders 150 and 160 are continuously driven to check the length and verticality of each of the elevator rope 120 and the elevator guide rail 130 in real time when the occupant evacuation elevator 110 is operated again, and, in this case, operating the occupant evacuation elevator 110 again is stopped when the length and verticality of each of the elevator rope 120 and the elevator guide rail 130 depart from the predetermined error range.

Ultimately, according to the embodiment of the present disclosure, slight distortion or location variation may be monitored in real time by installing a laser range finder on each of the elevator rope and the elevator guide rail of the occupant evacuation elevator of the skyscraper and checking the length and verticality of each of the elevator rope and the elevator guide rail measured from the laser range finder, and accordingly, the safety inspection of the occupant evacuation elevator may be easily performed.

Further, the safety inspection of the occupant evacuation elevator may be performed in real time to operate the occupant evacuation elevator again in the operation mode of the occupant evacuation elevator according to an occurrence of the disaster situation in the skyscraper and accordingly, occupants may safely and quickly evacuate.

According to the embodiment of the present disclosure, slight distortion or location variation can be monitored in real time by installing a laser range finder on each of an elevator rope and an elevator guide rail of an occupant evacuation elevator of a skyscraper and checking a length and verticality of each of the elevator rope and the elevator guide rail measured from the laser range finder, and accordingly, safety inspection of the occupant evacuation elevator can be easily performed.

According to the embodiment of the present disclosure, the safety inspection of the occupant evacuation elevator can be performed in real time to operate the occupant evacuation elevator again in an operation mode of the occupant evacuation elevator according to an occurrence of a disaster situation in the skyscraper, and accordingly, occupants can safely and quickly evacuate.

The above-described descriptions of the present disclosure are exemplary, and those skilled in the art of the present disclosure may understand that the present disclosure may be embodied in other specific forms without changing the technical spirit or essential characteristics. Accordingly, the above-described embodiments should be understood to be exemplary and not limiting. For example, each component described as a single entity may be distributed and implemented, and components described as being dispersed may be implemented in an integrated form.

The scope of the present disclosure is shown by the claims rather than the detailed description, and all variations or different forms derived from the means, scope, and equivalents of the claims should be interpreted to be included in the scope of the present disclosure.

What is claimed is:

1. A safety inspection system of an occupant evacuation elevator comprising:

an occupant evacuation elevator (OEE) provided with an elevator rope and an elevator guide rail, and in which, while the occupant evacuation elevator is ordinarily used for passengers in a skyscraper, in response to a disaster situation a mode of the occupant evacuation elevator converts to an operation mode, wherein the operation mode is an emergency mode, and a safety inspection is performed in a state in which the occupant evacuation elevator is stopped;

an occupant evacuation elevator safety inspection part configured to stop the operation of the occupant evacuation elevator in the operation mode which operates the occupant evacuation elevator and to perform the safety inspection to operate the occupant evacuation elevator again;

a first laser range finder attached to both ends of the elevator rope to measure a length and verticality of the elevator rope; and a second laser range finder attached to both ends of the elevator guide rail to measure a length and verticality of the elevator guide rail, wherein the occupant evacuation elevator safety inspection part completes the safety inspection of the occupant evacuation elevator and operates the occupant evacuation elevator again in response to the length and verticality of each of the elevator rope and the elevator guide rail being less than or equal to a predetermined error range.

2. The safety inspection system of the occupant evacuation elevator of claim 1, wherein the occupant evacuation elevator safety inspection part includes a first laser range finder driving part configured to drive the first laser range finder; a second laser range finder driving part configured to drive the second laser range finder; a power supply device configured to supply uninterruptible power to the first laser range finder and the second laser range finder; an elevator rope length and verticality checking part configured to check the length and verticality of the elevator rope according to a measuring result of the first laser range finder driving part; an elevator guide rail length and verticality checking part configured to check the length and verticality of the elevator guide rail according to a measuring result of the second laser range finder driving part; and a safety inspection controller configured to drive the first laser range finder driving part and the second laser range finder driving part and compare whether the length and verticality of each of the elevator rope length and verticality checking part and the elevator guide rail length and verticality checking part are within the predetermined error range to determine whether the elevator rope and the elevator guide rail are slightly adjusted, and configured to complete the safety inspection of the occupant evacuation elevator and operate the occupant evacuation elevator again in response to the length and verticality of each of the elevator rope and the elevator guide rail being less than or equal to the predetermined error range.

3. The safety inspection system of the occupant evacuation elevator of claim 2, wherein the occupant evacuation elevator safety inspection part further includes an adjustment amount determination part configured to compare the length and verticality of each of the elevator rope and the elevator guide rail with the error range of a predetermined length and verticality to determine a slight adjustment amount of each of the elevator rope and the elevator guide rail when slight adjustment is necessary.

4. The safety inspection system of the occupant evacuation elevator of claim 3, wherein tension of the elevator rope is slightly adjusted and location variation of the elevator guide rail is slightly adjusted when the adjustment amount determination part determines that slight adjustment is necessary.

5. The safety inspection system of the occupant evacuation elevator of claim 1, wherein the occupant evacuation elevator safety inspection part stops operating the occupant evacuation elevator again in response to the length and verticality of each of the elevator rope and the elevator guide rail being depart from the predetermined error range.

6. The safety inspection system of the occupant evacuation elevator of claim 1, wherein:

the first laser range finder includes a first laser light emitting part and a first laser light receiving part and measures the length and verticality of the elevator rope; and the second laser range finder includes a second laser light emitting part and a second laser light receiving part and measures the length and verticality of the elevator guide rail.

7. The safety inspection system of the occupant evacuation elevator of claim 6, wherein the first laser range finder and the second laser range finder are continuously driven to check the length and verticality of each of the elevator rope and the elevator guide rail in real time in response to the occupant evacuation elevator being operated again.

8. A safety inspection method of an occupant evacuation elevator (OEE) comprising:

a) normally operating all elevators of a skyscraper;
b) checking whether a disaster situation occurs in the skyscraper;
c) stopping operations of all elevators of the skyscraper and converting an occupant evacuation elevator to an operation mode in response to the disaster situation;
d) driving first and second laser range finders respectively installed in an elevator rope and an elevator guide rail of the occupant evacuation elevator;
e) checking a length and verticality of each of the elevator rope and the elevator guide rail measured from the first and second laser range finders; and
f) completing safety inspection of the occupant evacuation elevator and operating the occupant evacuation elevator again.

9. The safety inspection method of an occupant evacuation elevator of claim 8, wherein, in the operation e), the length and verticality of each of the elevator rope and the elevator guide rail are compared with an error range of a predetermined length and verticality to determine whether slight adjustment is necessary.

10. The safety inspection method of the occupant evacuation elevator of claim 9, wherein tension of the elevator rope is slightly adjusted and location variation of the elevator guide rail is slightly adjusted when slightly adjusting the elevator rope and the elevator guide rail is necessary.

11. The safety inspection method of the occupant evacuation elevator of claim 8, wherein, in the operation d), the first and second laser range finders are continuously driven to check the length and verticality of each of the elevator rope and the elevator guide rail in real time in response to the occupant evacuation elevator being operated again.

12. The safety inspection method of the occupant evacuation elevator of claim 8, wherein operating the occupant evacuation elevator again is stopped in response to the length and verticality of each of the elevator rope and the elevator guide rail being depart from a predetermined error range.

\* \* \* \* \*